United States Patent
Din et al.

(10) Patent No.: US 9,839,234 B2
(45) Date of Patent: Dec. 12, 2017

(54) THREE-DIMENSIONAL PRINTING DEVICE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Shih-Jer Din, New Taipei (TW); Jui-Feng Chang, New Taipei (TW); Shy-Huey Yee, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/621,327

(22) Filed: Feb. 12, 2015

(65) Prior Publication Data
US 2016/0193788 A1 Jul. 7, 2016

(30) Foreign Application Priority Data

Jan. 5, 2015 (CN) .......................... 2015 1 0002852

(51) Int. Cl.
*B33Y 30/00* (2015.01)
*A23P 20/20* (2016.01)
(Continued)

(52) U.S. Cl.
CPC ............ *A23P 20/20* (2016.08); *B29C 64/106* (2017.08); *B29C 64/386* (2017.08); *B33Y 30/00* (2014.12);
(Continued)

(58) Field of Classification Search
CPC .......... B33Y 30/00; B33Y 40/00; A23G 3/28; B29C 67/0085; B29C 67/0059; A23P 2020/253
See application file for complete search history.

(56) References Cited

U.S. PATENT DOCUMENTS 4,910,661 A * 3/1990 Barth .................... A21C 15/002
426/383
5,505,775 A * 4/1996 Kitos .................... A21C 15/002
118/13
(Continued)

FOREIGN PATENT DOCUMENTS

WO 2006020685 2/2006

OTHER PUBLICATIONS

"Search Report of European Counterpart Application", dated May 10, 2016, p. 1-p. 8.

*Primary Examiner* — Leslie J Evanisko
*Assistant Examiner* — Leo T Hinze
(74) *Attorney, Agent, or Firm* — JCIPRNET

(57) ABSTRACT

A 3D printing device, which is adapted to print a second object on a first object. The 3D printing device includes a body, a 3D printing unit, a sensor unit, a storage unit, a control unit and a carrier plate. The control unit is electrically connected to the 3D printing unit, the storage unit and the sensor unit. The storage unit stores initial coordinates, and the initial coordinates correspond to an initial printing position of the 3D printing unit. The carrier plate is located at a bottom of the body and has a ocular mark. The first object is adapted to be placed on the carrier plate. The sensor unit senses a height of the first object relative to the carrier plate, and the control unit drives the 3D printing unit to print the second object on the first object according to the height and the initial coordinates.

11 Claims, 12 Drawing Sheets

(51) Int. Cl.
  *B33Y 50/02*    (2015.01)
  *B29C 64/106*   (2017.01)
  *B29C 64/386*   (2017.01)
  *A23P 20/25*    (2016.01)

(52) U.S. Cl.
  CPC ......... *B33Y 50/02* (2014.12); *A23P 2020/253* (2016.08)

(56) References Cited

U.S. PATENT DOCUMENTS

| | | | | |
|---|---|---|---|---|
| 5,795,395 | A * | 8/1998 | Ben-Matitayhu | A23G 3/20 118/13 |
| 6,499,842 | B1 * | 12/2002 | Kofman | A01J 27/005 347/105 |
| 7,625,198 | B2 * | 12/2009 | Lipson | B29C 67/0055 425/169 |
| 7,908,750 | B2 * | 3/2011 | Goick | A21C 15/005 33/286 |
| D697,772 | S * | 1/2014 | Joseph | D7/698 |
| 2007/0071851 | A1 * | 3/2007 | Baker | B41J 3/407 426/87 |
| 2007/0116842 | A1 * | 5/2007 | Visona | A21C 15/002 426/549 |
| 2007/0228592 | A1 | 10/2007 | Dunn et al. | |
| 2014/0023996 | A1 | 1/2014 | Finn et al. | |
| 2014/0043630 | A1 * | 2/2014 | Buser | H04N 13/02 358/1.13 |
| 2015/0273768 | A1 * | 10/2015 | Wyatt | B29C 67/0088 700/119 |

* cited by examiner

THREE-DIMENSIONAL PRINTING DEVICE

CROSS-REFERENCE TO RELATED APPLICATION

This application claims the priority benefit of Chinese application serial no. 201510002852.9, filed on Jan. 5, 2015. The entirety of the above-mentioned patent application is hereby incorporated by reference herein and made a part of this specification.

BACKGROUND

Technical Field

The disclosure relates to a three-dimensional (3D) printing device.

Related Art

In recent years, along with quick development of technology, different methods for constructing physical three-dimensional (3D) models by using an additive manufacturing technology are provided. Generally, the additive manufacturing technology is to convert design data of the 3D model constructed by software such as computer aided design (CAD), etc. into a plurality of consecutively stacked thin (quasi-2D) cross-sectional layers. Meanwhile, a plurality of technical methods for forming the thin cross-sectional layers are gradually developed. For example, a printing unit of the 3D printing device can move above a printing platform along an XY-plane according to special coordinates XYZ constructed according to the design data of the 3D model, such that a constructing material can form a correct shape of the cross-sectional layer. Then, the printing unit is driven to move layer-by-layer along a Z-axis, and the cross-sectional layers can be consecutively stacked to form a 3D object after curing layer-by-layer.

However, when a second object is to be printed on a first object, how to effectively place the first object in the 3D printing area to avoid misalignment such as skew or offset occurred during the 3D printing process has to be considered by related practitioners.

SUMMARY

The disclosure is directed to a three-dimensional (3D) printing device, where a user can easily perform object alignment through a ocular mark.

The disclosure provides a 3D printing device, which is adapted to print a second object on a first object. The 3D printing device includes a body, a 3D printing unit, a sensor unit, a storage unit, a control unit and a carrier plate. The control unit is electrically connected to the 3D printing unit, the storage unit and the sensor unit. The storage unit is used for storing initial coordinates, and the initial coordinates correspond to an initial printing position of the 3D printing unit. The carrier plate is located at a bottom of the body and has a ocular mark. The first object is adapted to be placed on the carrier plate. The sensor unit is controlled by the control unit to sense a height of the first object relative to the carrier plate, and the control unit drives the 3D printing unit to print the second object on the first object according to the height and the initial coordinates.

The disclosure provides a 3D printing device, which is adapted to print a second object on a first object. The 3D printing device includes a body, a 3D printing unit, a sensor unit, a storage unit, a control unit, a carrier plate and a mark medium. The storage unit stores initial coordinates, where the initial coordinates correspond to an initial printing position of the 3D printing unit. The carrier plate is located at a bottom of the body. The first object is adapted to be placed on the carrier plate. The control unit is electrically connected to the 3D printing unit, the storage unit and the sensor unit. The mark medium has an ocular mark, and the ocular mark indicates a corresponding position of the initial coordinates. The sensor unit is controlled by the control unit to sense a height of the first object relative to the carrier plate, and the control unit drives the 3D printing unit to print the second object on the first object according to the height and the initial coordinates.

According to the above descriptions, in the aforementioned embodiment of the disclosure, the carrier plate has the ocular mark, and the ocular mark is used for indicating a corresponding position of the initial coordinates of the 3D printing unit, the user can place the first object on the carrier plate and align the first object through the ruler scale. Meanwhile, the sensor unit senses the height of the first object, such that the 3D printing device obtains a spatial position of the first object, and accurately prints the second object on the first object during the 3D printing. In this way, the device is unnecessary to additionally calculate the relative position of the first object, such that the time and cost of the 3D printing are effectively saved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
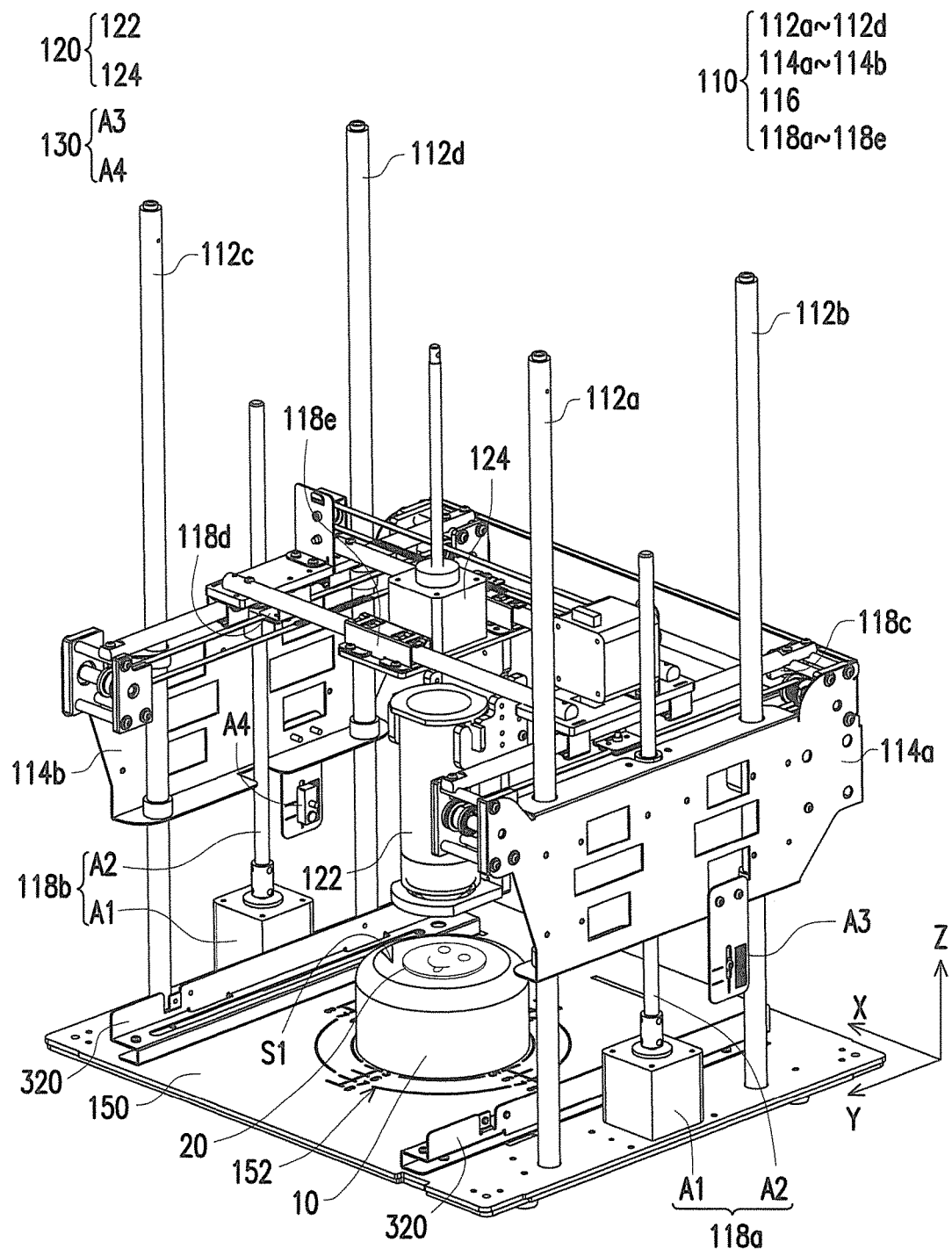
FIG. 1 is a schematic diagram of a 3D printing device according to an embodiment of the disclosure.
Figure 2:
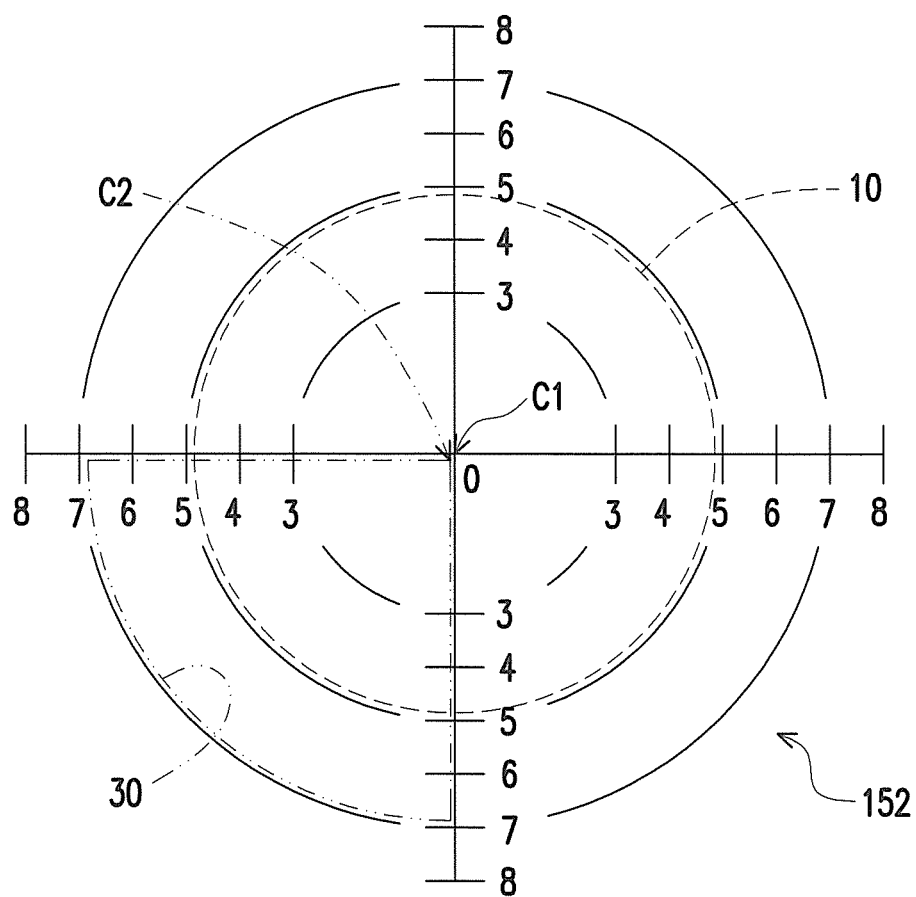
FIG. 2 is a partial top view of a bottom of the 3D printing device of FIG. 1.
Figure 3:
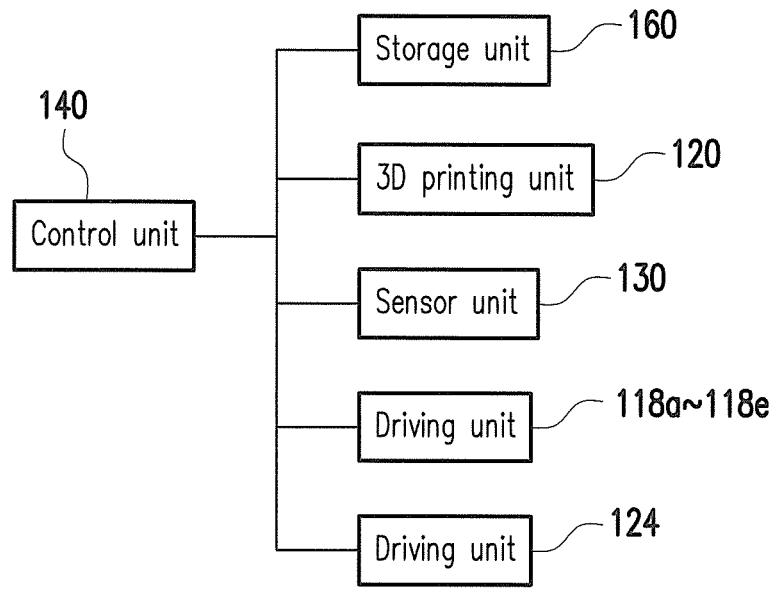
FIG. 3 is a schematic diagram of an electrical connection of a part of components in the 3D printing device of FIG. 1.

FIG. 1 is a schematic diagram of a 3D printing device according to an embodiment of the disclosure. FIG. 2 is a partial top view of the bottom of the 3D printing device of FIG. 1. FIG. 3 is a schematic diagram of an electrical connection of a part of components in the 3D printing device of FIG. 1. Referring to FIG. 1 to FIG. 3, in the present embodiment, the 3D printing device 100 is adapted to print a second object 20 on a first object 10. The 3D printing device 100 includes a body 110, a 3D printing unit 120, a sensor unit 130, a control unit 140, a carrier plate 150 and a storage unit 160. The control unit 140 is electrically connected to the 3D printing unit 120, the storage unit 160 and the sensor unit 130. The carrier plate 150 is located at a bottom of the body 110, and the storage unit 160 is used for storing initial coordinates, and the initial coordinates correspond to an initial printing position of the 3D printing unit 120 in the body 110, and the carrier plate 150 has an ocular mark for indicating the corresponding position of the initial coordinates. In the present embodiment, the ocular mark is, for example, a ruler scale 152 on the carrier plate 150. The first object 10 is adapted to be placed on the carrier plate 150. The sensor unit 130 is controlled by the control unit 140 to sense a height of the first object 10 relative to the carrier plate 150, and the control unit 140 drives the 3D printing unit 120 to print the second object 20 on the first object 10 according to the height and the aforementioned initial coordinates.

In detail, the body 110 includes a plurality of guide rods 112a-112d set on the bottom, a pair of brackets 114a and 114b, a connection rod 116 connected between the pair of the brackets 114a and 114b, and a plurality of driving units 118a-118e electrically connected to the control unit 140. The brackets 114a and 114b respectively sleeve the guide rods 112a-112d, and the driving units 118a and 118b are located at opposite sides of the carrier plate 150 and respectively include a motor A1 and a screw rod A2, where the motor A1 is disposed on the bottom of the body 110, and the screw rod A2 extends along a Z-axis and is coupled to the motor A1 and is driven by the same to rotate. The brackets 114a and 114b are connected to the screw rods A2 at two sides, and are adapted to move along the Z-axis. The driving units 118c and 118d are respectively disposed on the brackets 114a and 114b for driving the connection rod 116 and the 3D printing unit 120 thereon to move back and forth along a Y-axis. The driving unit 118e is disposed on the connection rod 116 for driving the 3D printing unit 120 to move along an X-axis. The 3D printing unit 120 includes a material barrel 122 and a driving unit 124, where the material barrel 122 is used for containing a printing material, and is movably disposed on the connection rod 116 through the driving unit 118e, and when the material barrel 122 moves to a specific position, the driving unit 124 is controlled by the control unit 140 to squeeze the printing material on a plane of the first object to form the second object 20.

In the present embodiment, the 3D printing unit 120 is adapted to implement 3D printing of food serving as the printing material, i.e. the first object 10 and the second object are all food. For example, through the 3D printing unit 120 of the disclosure, a plurality of cream patterns (i.e. the second object 20) can be printed on a cake base (i.e. the first object 10). However, as described above, since the second object 20 is not directly printed on the carrier plate 150, a position of the first object 10 in the body 110 has to be confirmed in order to accurately print the second object 20 on the first object 10.

Figure 4:
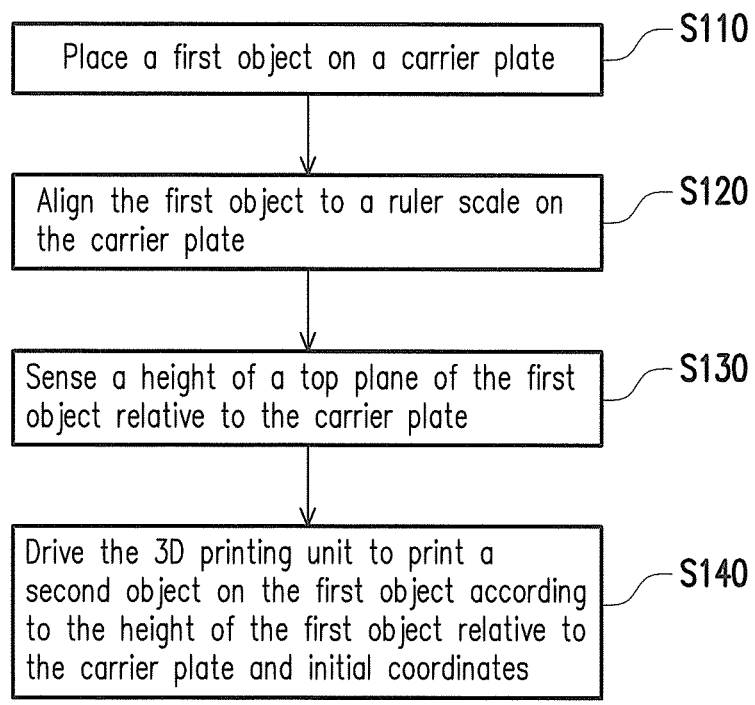
FIG. 4 is a flowchart illustrating a 3D printing process according to an embodiment of the disclosure.

Therefore, FIG. 4 is a flowchart illustrating a 3D printing process according to an embodiment of the disclosure. Referring to FIG. 4, and FIG. 1 to FIG. 3, in step S110, the first object 10 is placed on the carrier plate 150. Then, in step S120, the first object 10 is aligned to the ruler scale 152 on the carrier plate 150. In step 130, the sensor unit 130 senses a height of a top plane S1 of the first object 10 relative to the carrier plate 150 (i.e. a plane where the ruler scale 152 is located). It should be noticed that the sensor unit 130 includes an emitter A3 and a receiver A4 respectively disposed on the brackets 114a and 114b, and determines a height difference between the top plane S1 of the first object 10 and the plane where the ruler scale 152 is located, so as to determine a relative position that the driving units 118a and 118b control the 3D printing unit 120 along the Z-axis. The type and configuration position of the sensor unit 130 on the body 110 are not limited by the disclosure, and as long as a sensor of the existing technique is capable of sensing the height of the first object 10 disposed on the carrier plate 150, it is considered to be adapted to the present embodiment.

Finally, in step S140, the 3D printing device 100 is started, and according to the aforementioned collected information, i.e. the height of the top plane S1 of the first object 10 relative to the carrier plate 150, the control unit 140 controls the 3D printing unit 120 to print the second object 20 on the first object 10 according to the height and the initial coordinates. It should be noticed that since the first object 10 has been placed on the carrier plate 150 and is aligned through the ruler scale 152, the 3D printing device 100 is only required to correspondingly set the specific position of the first object 10 corresponding to the ruler scale 152, and according to the aforementioned sensed height, the 3D printing unit 120 can print the second object 20 within the required range on the XY-plane. For example, as shown in FIG. 2, the first object 10 is placed within a scale 5 of the ruler scale 152, when the 3D printing is performed, the 3D printing unit 120 is only required to perform the 3D printing within the range of the scale 5. Therefore, the 3D printing device is unnecessary to additionally align and set the first object 10, which saves a time of the 3D printing.

However, a relative relationship between the first object and the ruler scale is not limited by the disclosure, which can be correspondingly set according to a contour and a size of the first object. In other words, the initial coordinates (the initial printing position) of the 3D printing unit 120 can be any position on the ocular mark (i.e. the ruler scale 152 of the present embodiment), and in the aforementioned embodiment, the initial coordinates correspond to a reference point C1 of the ruler scale 152 (i.e. a center point with a scale of 0), and since the first object 10 has a symmetric contour, a shape center of the first object 10 is located on the reference point 10, such that the first object 10 presents a symmetric contour relative to the reference point C1. In other words, the shape center of the first object 10 is taken as a reference point, and the reference point of the first object 10 is adapted to the reference point of the ruler scale 152. Certainly, in other embodiments, to facilitate related operations, suitable modifications can also be made. A shown in FIG. 2, a first object 30 presents a fan shape, and an endpoint C2 of the first object 30 is aligned to the reference point C1, such that the first object 30 is located in one quadrant of the ruler scale 152, i.e. now the endpoint C2 of the first object 30 is taken as the reference point. Therefore, the 3D printing unit 120 is only required to perform the 3D printing with reference of the above quadrant of the ruler scale 152, and the second object (not shown) can be successfully formed on the first object 30. Therefore, by forming the aforementioned relative relationship between the reference point of the first object and the reference point of the ruler scale 152, the control unit 140 can control the 3D printing unit 120 to print the second object on the first object according to the aforementioned relative relationship.

Figure 5:
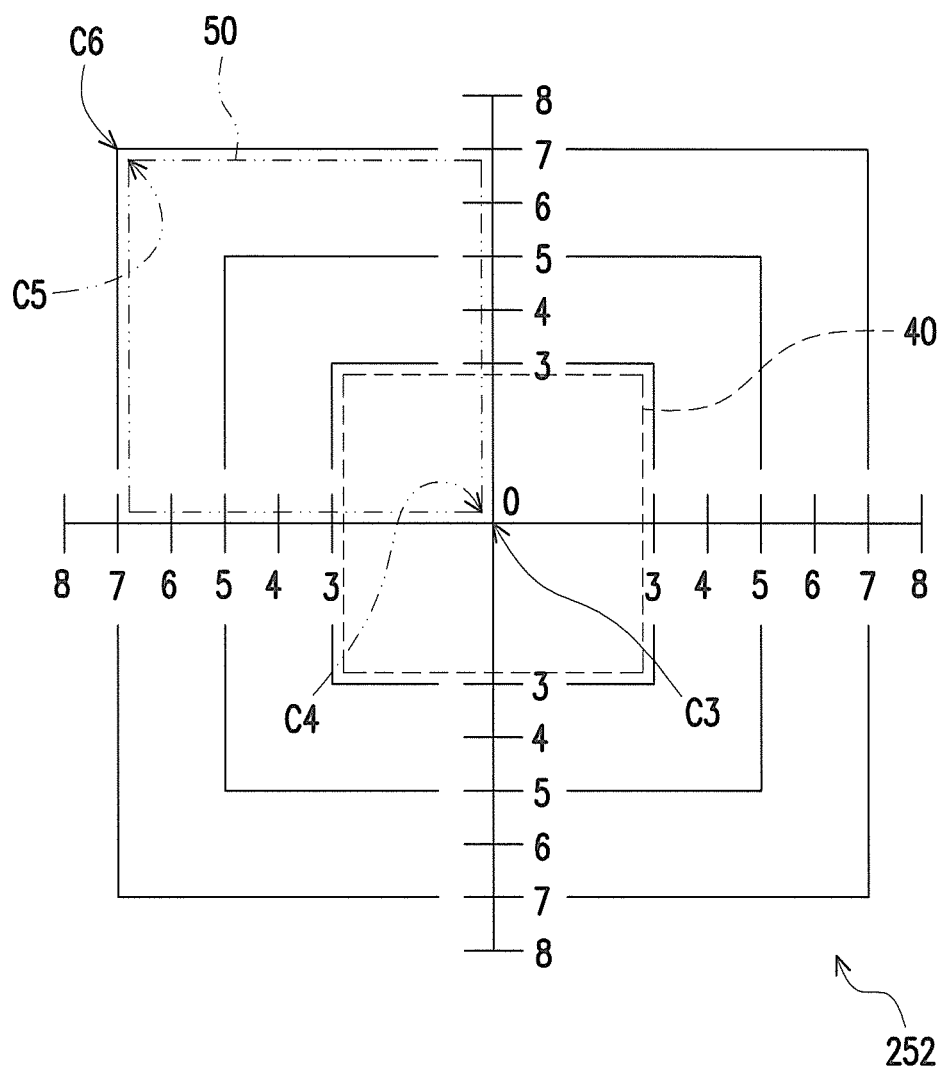
FIG. 5 is a partial top view of a carrier plate of a 3D printing device according to another embodiment of the disclosure.

FIG. 5 is a partial top view of a carrier plate of a 3D printing device according to another embodiment of the disclosure. Referring to FIG. 5, different to the aforementioned embodiment, the ruler scale 152 of the aforementioned embodiment presents a concentric circle pattern, while the ruler scale 252 of the present embodiment presents a concentric polygon pattern (for example, a concentric quadrilateral), since the first object probably has a plurality of contours, the ruler scale 252 on the carrier plate can also be varied along with the contour of the first object. As shown in FIG. 5, since a first object 40 is a quadrilateral, the quadrilateral ruler scale 252 is adopted, such that a shape center of the first object 40 can be successfully aligned to a reference point C3 of the ruler scale 252 (i.e. a center point of the ruler scale 252). Similarly, the user can also align an endpoint C4 of a first object 50 to the reference point C3 of the ruler scale 252, or align an endpoint C4 of the first object 50 to an endpoint C6 of the ruler scale 252, so as to achieve an effect of aligning the first object to the ruler scale.

Moreover, it should be noticed that in the embodiment of FIG. 2 and FIG. 5, in order to facilitate recognizing the first object and the ruler scale, the dot line contour of the first object is misaligned to the ruler scale in presentation.

Figure 6:
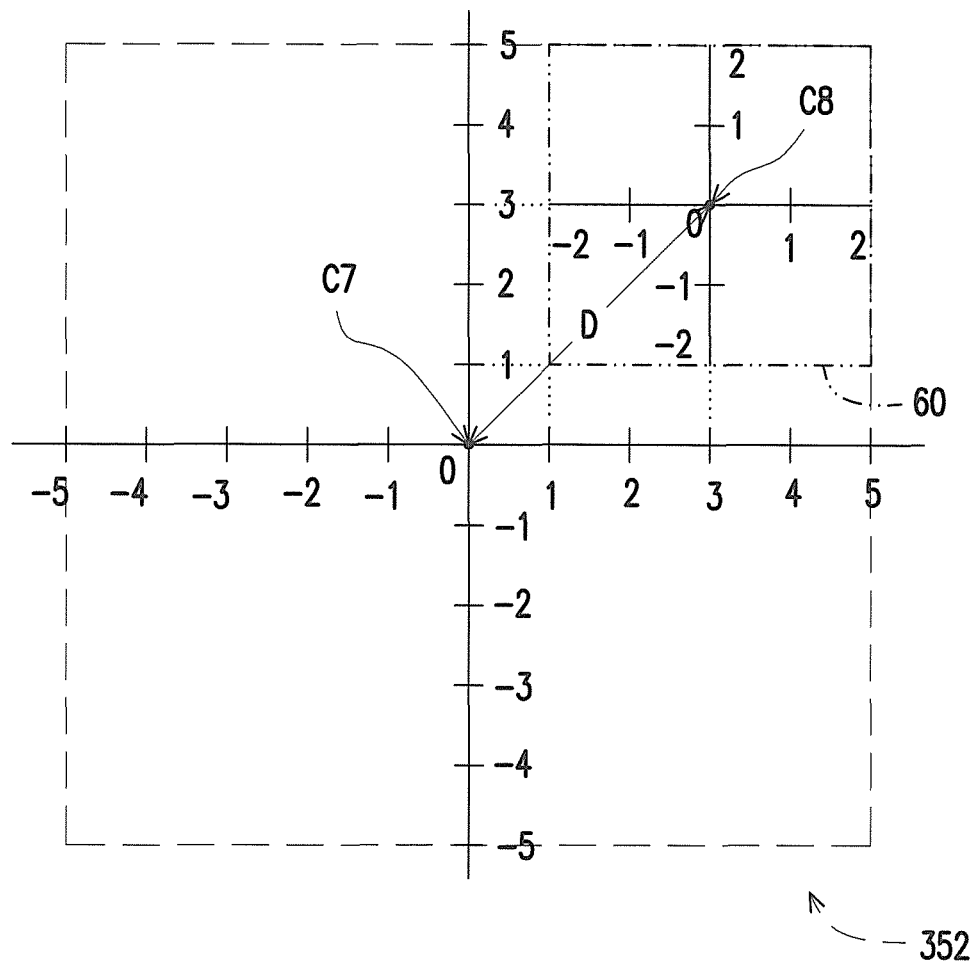
FIG. 6 is a partial top view of a carrier plate of a 3D printing device according to another embodiment of the disclosure.

FIG. 6 is a partial top view of a carrier plate of a 3D printing device according to another embodiment of the disclosure. In the aforementioned embodiment, regardless of whether an endpoint or the shape center of the first object is taken as the reference point, the reference point of the first object is coincided to the reference point of the ruler scale. However, different to the aforementioned embodiment, an origin point of the ruler scale 352 is taken as a reference point C7, and a first object 60 has a reference point C8, where the reference points C7 and C8 has a relative displacement there between. For example, the reference point of the first object 60 is located at (3,3) of the ruler scale 352, the relative displacement can be represented by a vector D(3,3), and a printable scope of the first object 60 is (−2~+2, −2~+2), so that regarding the ruler scale 352, a printable scope of the 3D printing unit 120 is (+1~+5, +1~+5), and the printable scope of the 3D printing unit 120 is still smaller than or equal to an area of a top plane of the first object 60.

Figure 7:
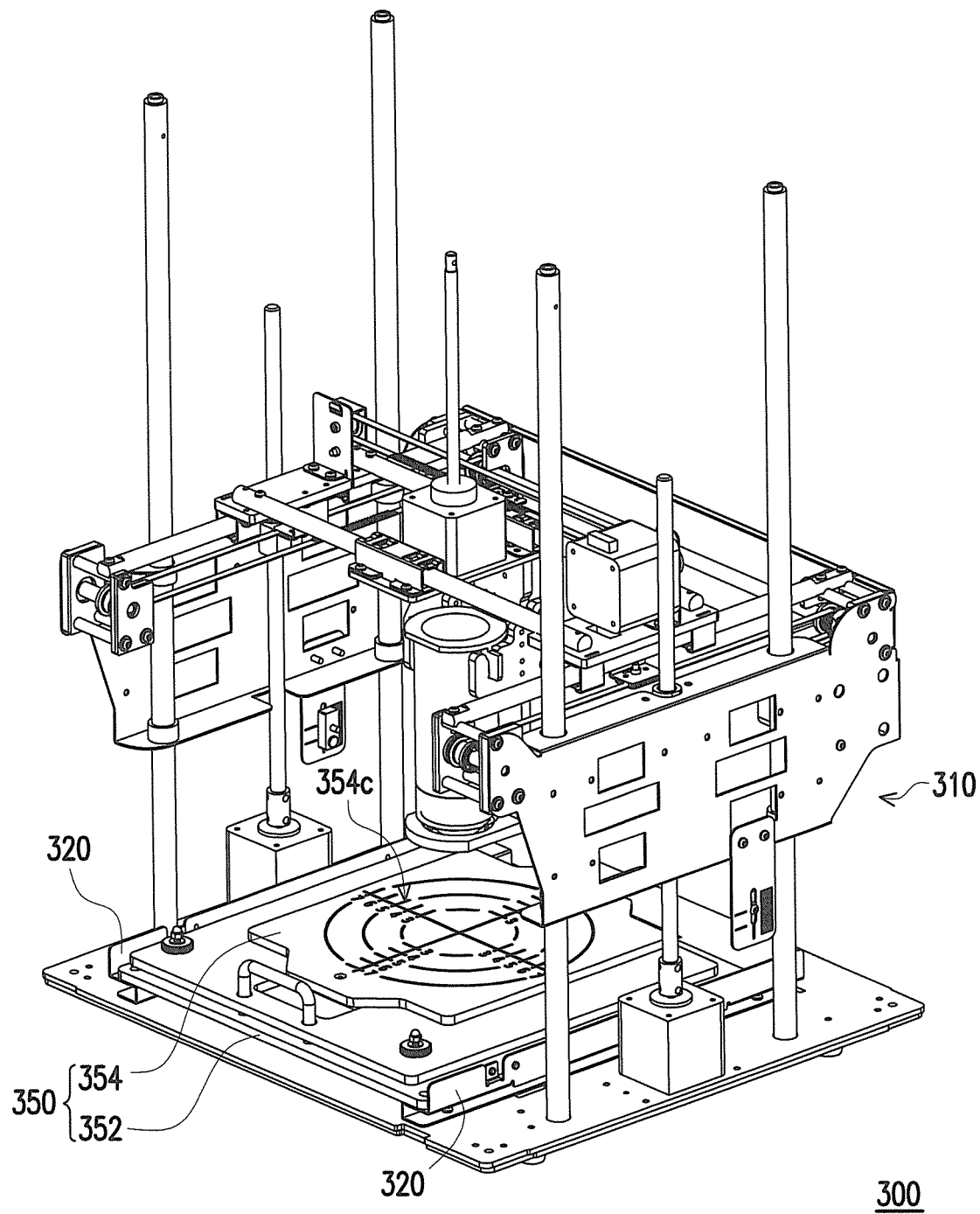
FIG. 7 is a schematic diagram of a 3D printing device according to another embodiment of the disclosure.
Figure 8:
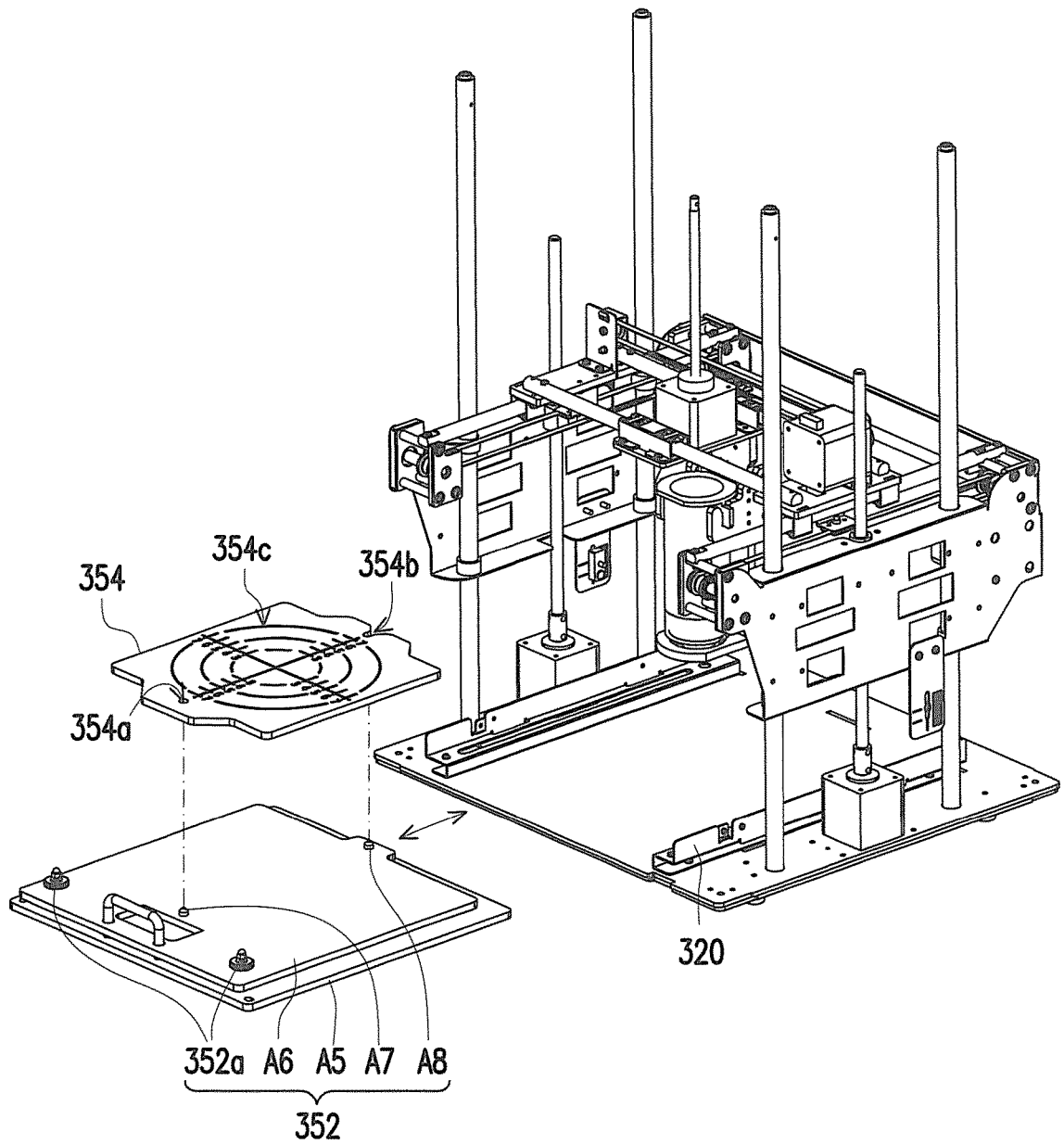
FIG. 8 is an exploded view of the 3D printing device of FIG. 7.

FIG. 7 is a schematic diagram of a 3D printing device according to another embodiment of the disclosure. FIG. 8 is an exploded view of the 3D printing device of FIG. 7. Referring to FIG. 7 and FIG. 8, the components of the present embodiment that are the same to that of the aforementioned embodiment are not repeated, and a difference between the present embodiment and the aforementioned embodiment is that the carrier plate 350 of the 3D printing device 300 is detachably disposed on the bottom of the body 310. Further, the 3D printing device 300 of the present embodiment further includes a track 320 disposed on the bottom of the body 310, and the carrier plate 350 includes a first plate member 352 and a second plate member 354 stacked to each other, where the first plate member 352 is movably disposed on the track 320, and the second plate member 354 is detachably positioned on the first plate member 352, and the second plate member 354 has a ruler scale 354c.

It should be noticed that the first plate member 352 is a double layer structure containing a substrate A5 and a carrier A6, where the carrier A6 is assembled to the substrate A5 through lock adjustment members 352a, such that when the carrier A6 and the substrate A5 are assembled, a height of the carrier A6 relative to the substrate A5 can be adjusted through the lock adjustment members 352a. Moreover, positioning poles A7 and A8 are set on the carrier A6, and the second plate member 354 has a positioning hole 354a and a positioning notch 354b, such that by positioning the positioning pole A7 to the positioning hole 354a and positioning the positioning pole A8 to the positioning notch 354b, the second plate member 354 can be successfully positioned on the carrier A6. Therefore, through collaboration of the track 320 and the first plate member 352, and based on a structural relationship between the first plate member 352 and the second plate member 354, the second plate member 354 having the ruler scale 354c can be easily replaced. In this way, the user can adopt various ruler scales 354c by replacing the second plate member 354, by which an application scope of the 3D printing device 300 on the first object (not shown, and referring to the aforementioned embodiment for reference) can be expanded.

Figure 9:
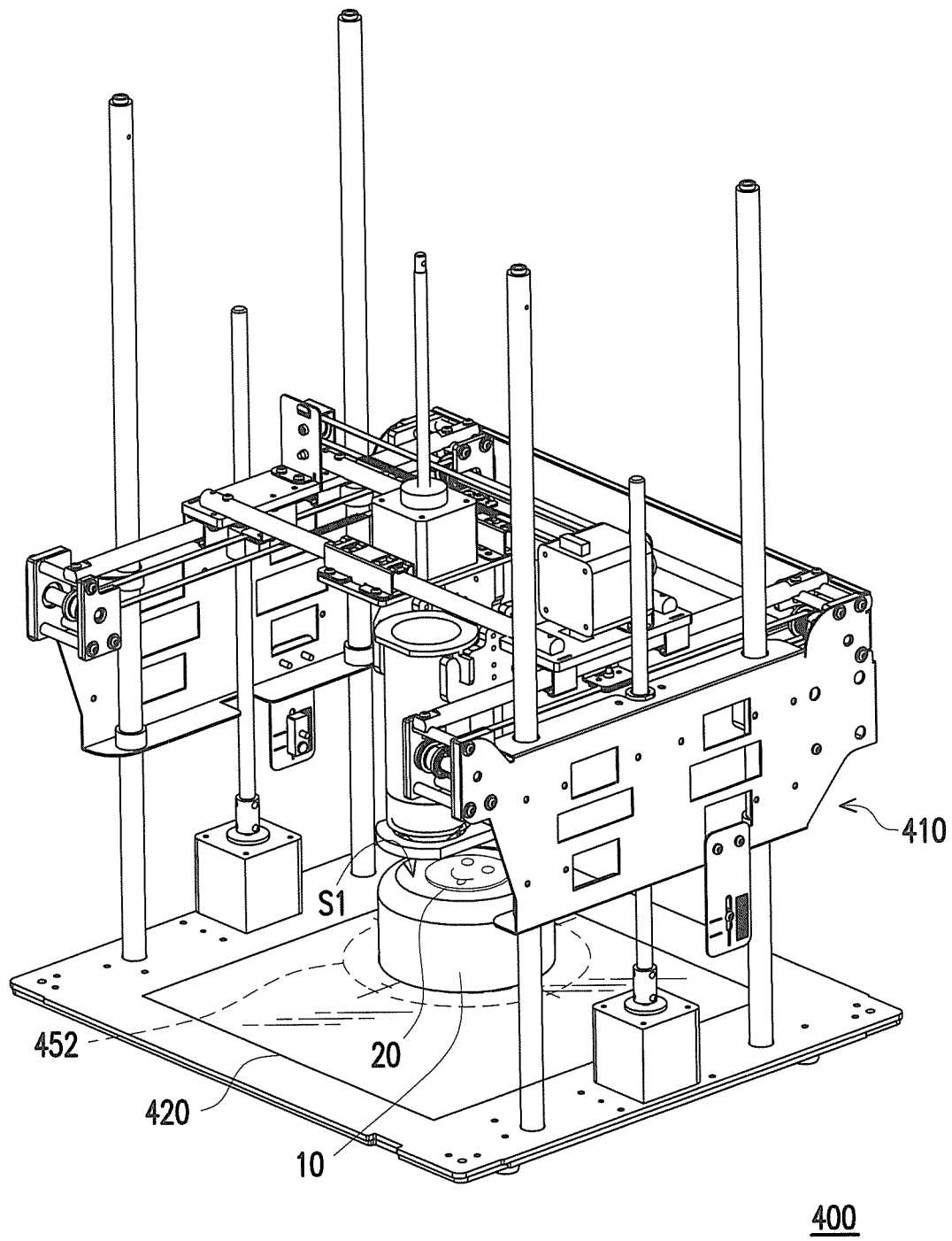
FIG. 9 is a schematic diagram of a 3D printing device according to another embodiment of the disclosure.
Figure 10:
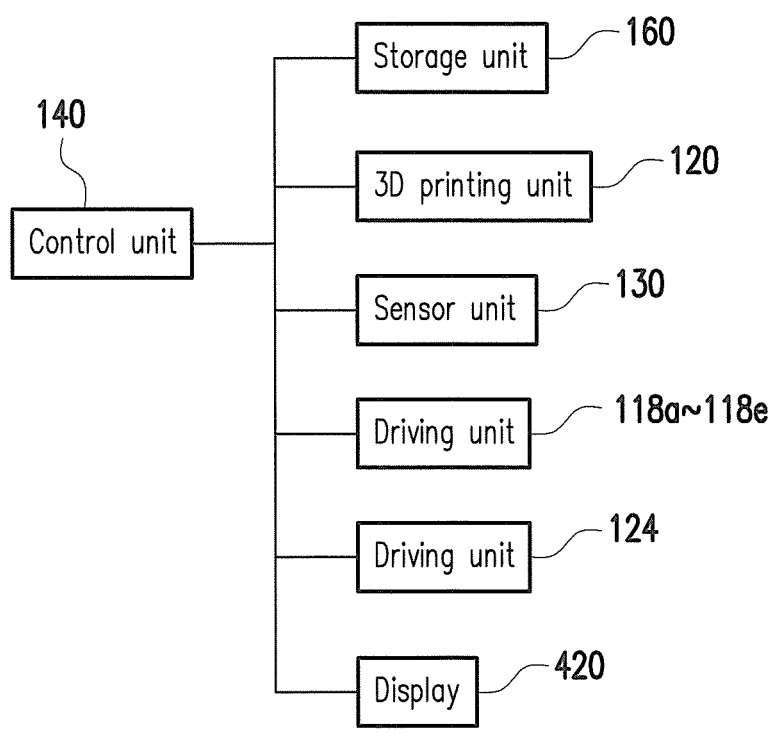
FIG. 10 is a schematic diagram of an electrical connection of the 3D printing device of FIG. 9.

FIG. 9 is a schematic diagram of a 3D printing device according to another embodiment of the disclosure. FIG. 10 is a schematic diagram of an electrical connection of the 3D printing device of FIG. 9. Referring to FIG. 9 and FIG. 10, different to the aforementioned embodiment, a display 420 is set on the bottom of the body 410 of the 3D printing device 400 to replace the carrier plate and the ruler scale thereon in the aforementioned embodiments. The display 420 is electrically connected to the control unit 140, and the first object 10 is adapted to be placed on any position of the display 420. The display 420 displays a ruler scale 452 to facilitate the user placing the first object 10 on the display 420 and aligning to the ruler scale 452. In other words, the ruler scale 452 of the present embodiment is substantially a virtual pattern, and the user is unnecessary to produce a physical carrier plate in advance, and since the scope of the ruler scale is complied with the plane of the first object, and the contour of the ruler scale can be complied with the contour of the first object, the user is unnecessary to replace the carrier plate in allusion to different first objects as that does in the aforementioned embodiment.

Then, once the first object 10 is aligned to the ruler scale 452 on the display 420, as that described in the above embodiment, the sensor unit 130 senses the height of the top surface S1 of the first object 10 relative to the display 420, and the control unit 140 drives the 3D printing unit 120 to print the second object 20 on the top plane S1 of the first object 10 according to the information of the ruler scale displayed on the display 420 and the height of the first object 10.

Figure 11:
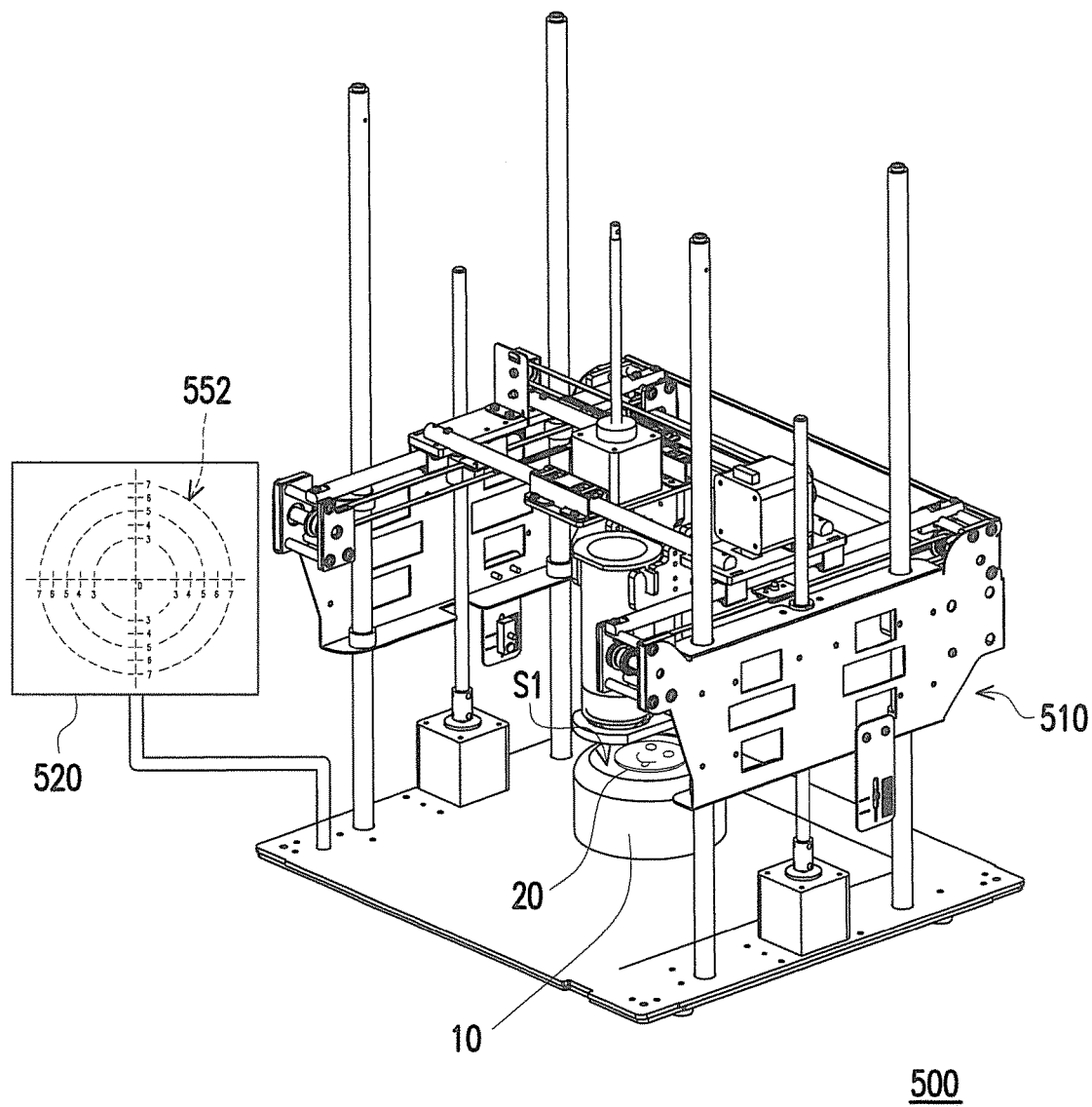
FIG. 11 is a schematic diagram of a 3D printing device according to another embodiment of the disclosure.
Figure 12:
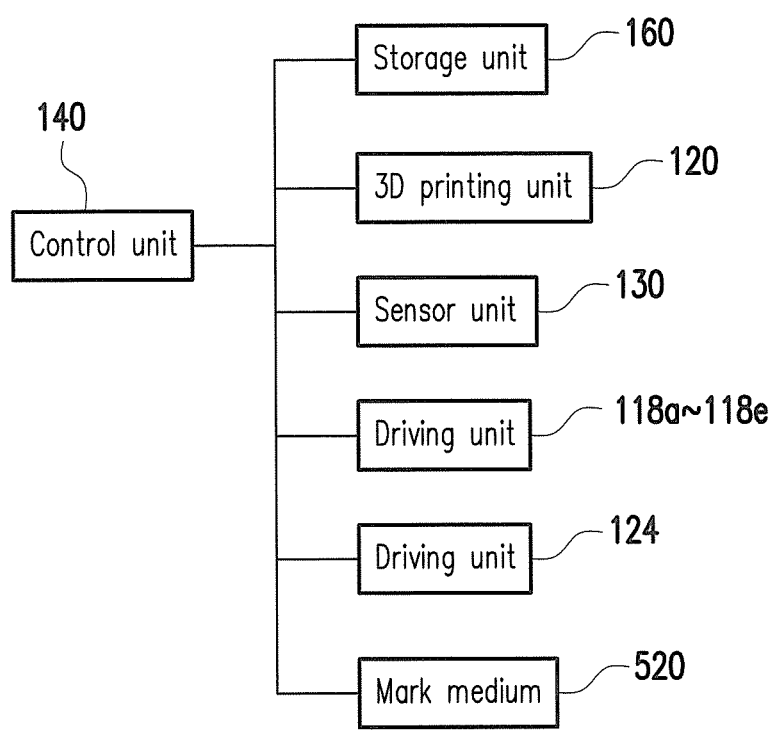
FIG. 12 is a schematic diagram of an electrical connection of the 3D printing device of FIG. 11.

FIG. 11 is a schematic diagram of a 3D printing device according to another embodiment of the disclosure. FIG. 12 is a schematic diagram of an electrical connection of the 3D printing device of FIG. 11. Different to the aforementioned embodiment, the 3D printing device 500 further includes a mark medium 520 disposed beside a body 510, and the mark medium 520 has an ocular mark 525 indicating a corresponding position of the initial coordinates of the 3D printing unit 120 (referring to related referential number of FIG. 1). In this way, the user can place the first object 10 on the carrier plate 150 (referring to related referential number of FIG. 1) according to the position shown on the mark medium 520. In the present embodiment, the mark medium 520 is, for example, a display, which can display the ocular mark 525 of different patterns according to an actual requirement. In another embodiment that is not shown, the mark medium can be a different medium used of displaying various patterns such as a paper, etc.

Figure 13:
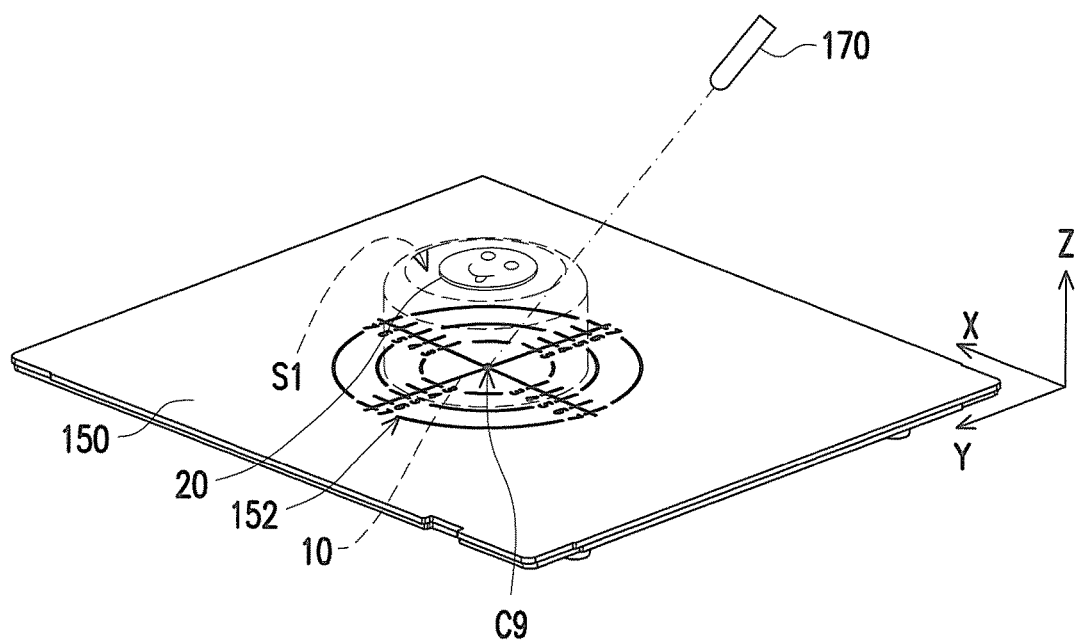
FIG. 13 is a schematic diagram illustrating alignment of a 3D printing device according to another embodiment of the disclosure.

FIG. 13 is a schematic diagram illustrating alignment of a 3D printing device according to another embodiment of the disclosure. In FIG. 13, a part of the components of the 3D printing device is omitted, and the embodiment of FIG. 1, FIG. 9 or FIG. 10 can be referred for implementation. The embodiment of FIG. 1 is referred for reference, and the related components and referential numbers of the present embodiment may refer to the embodiment FIG. 1, which are not repeated. In the present embodiment, the 3D printing device further includes an indicating unit 170, which is disposed on the body 110 and electrically connected to the control unit 140. The indicating unit 170 is, for example, an infrared laser, and displays an ocular mark C9 on the carrier plate 150 in an optical manner, so as to facilitate the user to align the first object 10 thereto. The present embodiment corresponds to the aforementioned embodiments of FIG. 2 and FIG. 5, i.e. the indicating unit 170 indicates the initial position on the ruler scale 152 to serve as an alignment reference for the first object 10.

In the present embodiment, since the carrier plate 150 already has a part of the ocular mark (i.e. the ruler scale 152), the indicating unit 170 is only used for indicating the initial coordinates of the 3D printing unit. However, the disclosure is not limited thereto, an in another embodiment that is not shown, when the carrier plate does not have the aforementioned ruler scale, the indicating unit can display an ocular mark having a 2D pattern on the carrier plate through corresponding configuration of a vibration mechanism (for example, a scan mirror or a vibration mirror), so as to facilitate alignment of the first object.

In summary, in the aforementioned embodiments of the disclosure, by setting the carrier plate having the ruler scale at the bottom of the body, the user can place the first object on the carrier plate and align the same according to the ruler scale, such that the first object and the ruler scale have a relative relationship, and after the sensor senses the height of the first object relative to the carrier plate, complete spatial information of the first object on the carrier plate is obtained. In this way, the 3D printing device can determine a position (i.e. spatial coordinates) of the top plane of the first object according to the aforementioned relative relationship and the height, and can directly printing the second object on the first object. Therefore, based on the ruler scale on the carrier plate and the height sensed by the sensor, the 3D printing device is unnecessary to additionally sense and calculate the spatial position of the first object, namely, the user is only required to input a planar position of the first object on the carrier plate to the 3D printing device, by which the time required for implementing the 3D printing is effectively saved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing device, adapted to print a second object on a first object, the three-dimensional printing device comprising:
    a body, having a plurality of brackets adapted to move along a height direction of the first object;
    a three-dimensional printing unit, movably disposed on the body;
    a storage unit, storing initial coordinates, wherein the initial coordinates correspond to an initial printing position of the three-dimensional printing unit;
    a carrier plate, detachably disposed at a bottom of the body, and having an ocular mark, wherein the ocular mark indicates a corresponding position of the initial coordinates, and the initial coordinates are aligned with and correspond to a geometric center point of the ocular mark;
    a sensor unit, disposed on the brackets; and
    a control unit, electrically connected to the three-dimensional printing unit and the body, the storage unit and the sensor unit, wherein the sensor unit is controlled to move synchronously with the brackets and the three-dimensional printing unit in the height direction of the first object to sense a height of the first object relative to the carrier plate, and the control unit drives the three-dimensional printing unit to print the second object on the first object according to the height and the initial coordinates.

2. The three-dimensional printing device as claimed in claim 1, wherein the first object has a plane, the second object is located on the plane, and the sensor unit is used for sensing the height of the plane relative to the carrier plate.

3. The three-dimensional printing device as claimed in claim 1, wherein the ocular mark is a ruler scale, and the initial coordinates are within a scope of the ruler scale.

4. The three-dimensional printing device as claimed in claim 1, wherein the first object and the second object are food.

5. The three-dimensional printing device as claimed in claim 1, wherein the carrier plate is a display, and the control unit is electrically connected to the display to control the appearance of the ocular mark on the carrier plate, and the ocular mark is changed to different patterns according to an actual requirement.

6. The three-dimensional printing device as claimed in claim 1, the brackets are correspondingly disposed at opposite sides of the three-dimensional printing unit, and the sensor unit comprises an emitter and a receiver respectively disposed on the brackets disposed at the opposite sides.

7. The three-dimensional printing device as claimed in claim 1, wherein the body further comprises a plurality of driving units electrically connected to the control unit and respectively disposed on the brackets.

8. The three-dimensional printing device as claimed in claim 1, wherein the three-dimensional printing unit is coupled to the brackets, so as to move synchronously with the brackets along a direction perpendicular to the carrier plate.

9. The three-dimensional printing device as claimed in claim 1, further comprising an indicating unit which emits light to indicate the initial printing position for alignment of the carrier plate.

10. The three-dimensional printing device as claimed in claim 9, wherein the ocular mark is a ruler scale, and the indicating unit emits light as a reference at the bottom of the body for a geometric center point of the ruler scale to be aligned with.

11. The three-dimensional printing device as claimed in claim 10, wherein a geometric center of the first object is taken as a reference point and aligned with the geometric center point of the ruler scale.

* * * * *